US012695130B2

(12) United States Patent
Zhao

(10) Patent No.: US 12,695,130 B2
(45) Date of Patent: Jul. 28, 2026

(54) LIQUID-COOLED BATTERY MODULE AND BATTERY PACK

(71) Applicant: CALB Co., Ltd., Jiangsu (CN)

(72) Inventor: Dong Zhao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 737 days.

(21) Appl. No.: 18/079,013

(22) Filed: Dec. 12, 2022

(65) Prior Publication Data

US 2024/0113359 A1     Apr. 4, 2024

(30) Foreign Application Priority Data

Sep. 30, 2022     (CN) ......................... 202222620072.9

(51) Int. Cl.
*H01M 10/6554*     (2014.01)
*H01M 10/613*      (2014.01)
*H01M 10/6568*     (2014.01)
*H01M 50/204*      (2021.01)
*H01M 50/262*      (2021.01)

(52) U.S. Cl.
CPC ..... *H01M 10/613* (2015.04); *H01M 10/6554* (2015.04); *H01M 10/6568* (2015.04); *H01M 50/204* (2021.01); *H01M 50/262* (2021.01)

(58) Field of Classification Search
CPC ........... H01M 10/613; H01M 10/6554; H01M 10/6568; H01M 50/204; H01M 50/262; Y02E 60/10
See application file for complete search history.

(56) References Cited

U.S. PATENT DOCUMENTS

2022/0093989 A1     3/2022   Quy et al.
2022/0140428 A1     5/2022   Chi et al.

FOREIGN PATENT DOCUMENTS

CN          217062269        7/2022
WO     WO-2020190062 A1 *  9/2020  .......... H01M 50/289

OTHER PUBLICATIONS

"Search Report of Europe Counterpart Application", issued on Aug. 28, 2023, p. 1-p. 8.
Office Action of European Counterpart Application, issued on Aug. 4, 2025, pp. 1-5.

* cited by examiner

*Primary Examiner* — Eugenia Wang
(74) *Attorney, Agent, or Firm* — JCIP GLOBAL INC.

(57) ABSTRACT

The disclosure discloses a liquid-cooled battery module and a battery pack. The liquid-cooled battery module includes a housing, the outer side surfaces of the two opposite side walls of the housing are provided with connecting portions, so that the liquid-cooled battery module is connected to the battery pack through the connecting portions; a single battery pack, which is disposed in the housing; further includes a heat-dissipating component, which is disposed at the bottom of the housing and connected with the single battery pack. In the vertical direction, the top surface of the heat-dissipating component is spaced apart from the bottom surface of two opposite side walls provided with the connection portions.

8 Claims, 4 Drawing Sheets

LIQUID-COOLED BATTERY MODULE AND BATTERY PACK

CROSS-REFERENCE TO RELATED APPLICATION

This application claims the priority benefit of China application serial no. 202222620072.9, filed on Sep. 30, 2022. The entirety of the above-mentioned patent application is hereby incorporated by reference herein and made a part of this specification.

BACKGROUND

Technical Field

The disclosure relates to the technical field of batteries, in particular to a liquid-cooled battery module and a battery pack.

Description of Related Art

With the development of power battery industry, all of current battery modules are independent liquid-cooled structures. A liquid-cooling plate is arranged at the bottom of the battery module by fixing the bottom of the side plate on the liquid-cooling plate. However, the battery module of this structure has the following defects: the battery module of this structure is suspended over a mounting beam in the battery pack by setting a mounting portion on the side plate. On the one hand, since the battery module is heavy, the deformation of the side plate during the suspending process will indirectly cause the deformation of the liquid-cooling plate, and the service life of the liquid-cooling plate will be significantly reduced; on the other hand, heat transfer will occur between the liquid-cooling plate and the mounting beam through the side plate, as a result, part of the heat dissipation effect of the liquid-cooling plate will be reduced and the batteries in the battery module cannot be effectively cooled.

SUMMARY

The present disclosure provides a liquid-cooled battery module and a battery pack.

The technical solution adopted by the present disclosure for solving the above problem is as follows:

A liquid-cooled battery module, including:

A housing, and the outer side surfaces of two opposite side walls of the housing are provided with connecting portions, so as to connect the liquid-cooled battery module and the battery pack through the connecting portions;

A single battery pack, arranged in the housing; and further includes:

A heat-dissipating component, which is arranged at the bottom of the housing and is connected to the single battery pack. In a vertical direction, a top surface of the heat-dissipating component and the bottom surfaces of the two opposite side walls provided with the connecting portion are spaced apart.

In the liquid-cooled battery module of the present disclosure, the heat-dissipating component at the bottom and the side wall provided with the connecting portion of the housing are connected in a non-contact manner.

On the other hand, the present disclosure further provides a battery pack, which includes the above-mentioned battery module.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The present disclosure provides a liquid-cooled battery module and a battery pack, which are able to prevent the liquid-cooling plate from being deformed by external forces and subsequently affecting the service life, while being able to effectively ensure the heat transfer between the liquid-cooling plate and the single battery pack.

Figure 1:
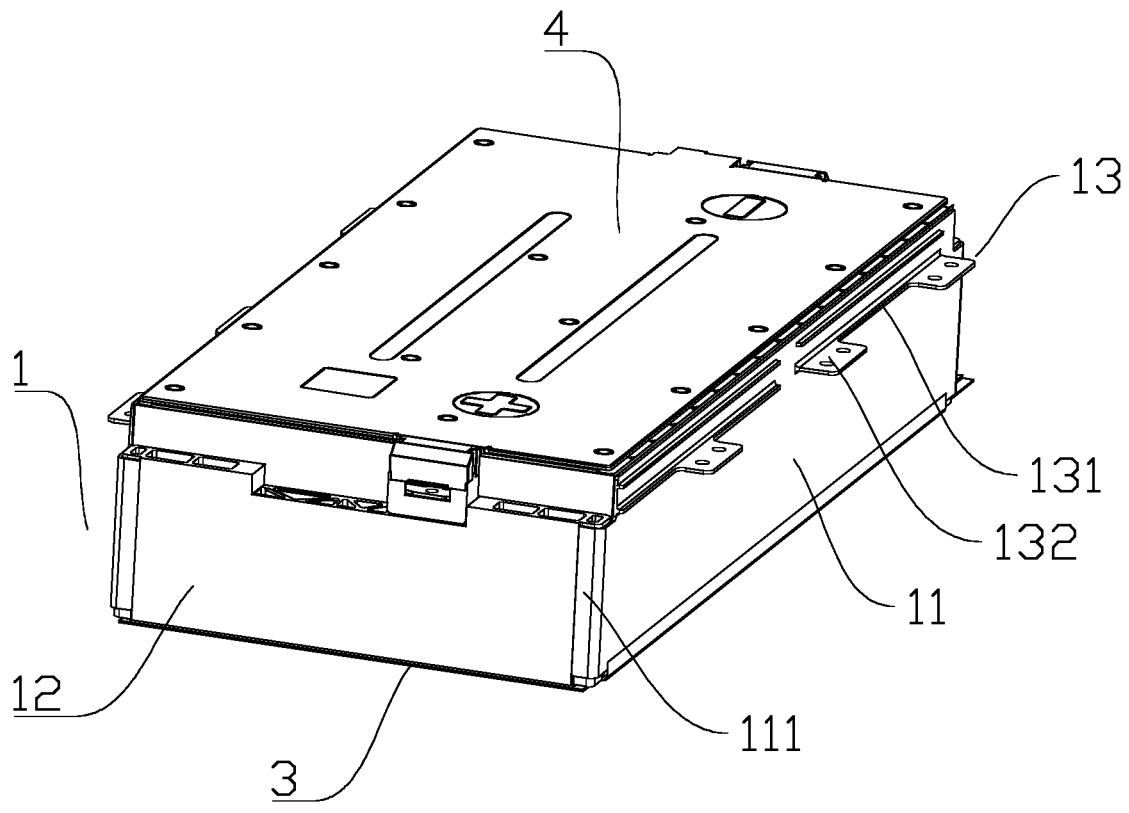
FIG. 1 is a schematic structural view of a liquid-cooled battery module in an embodiment.
Figure 2:
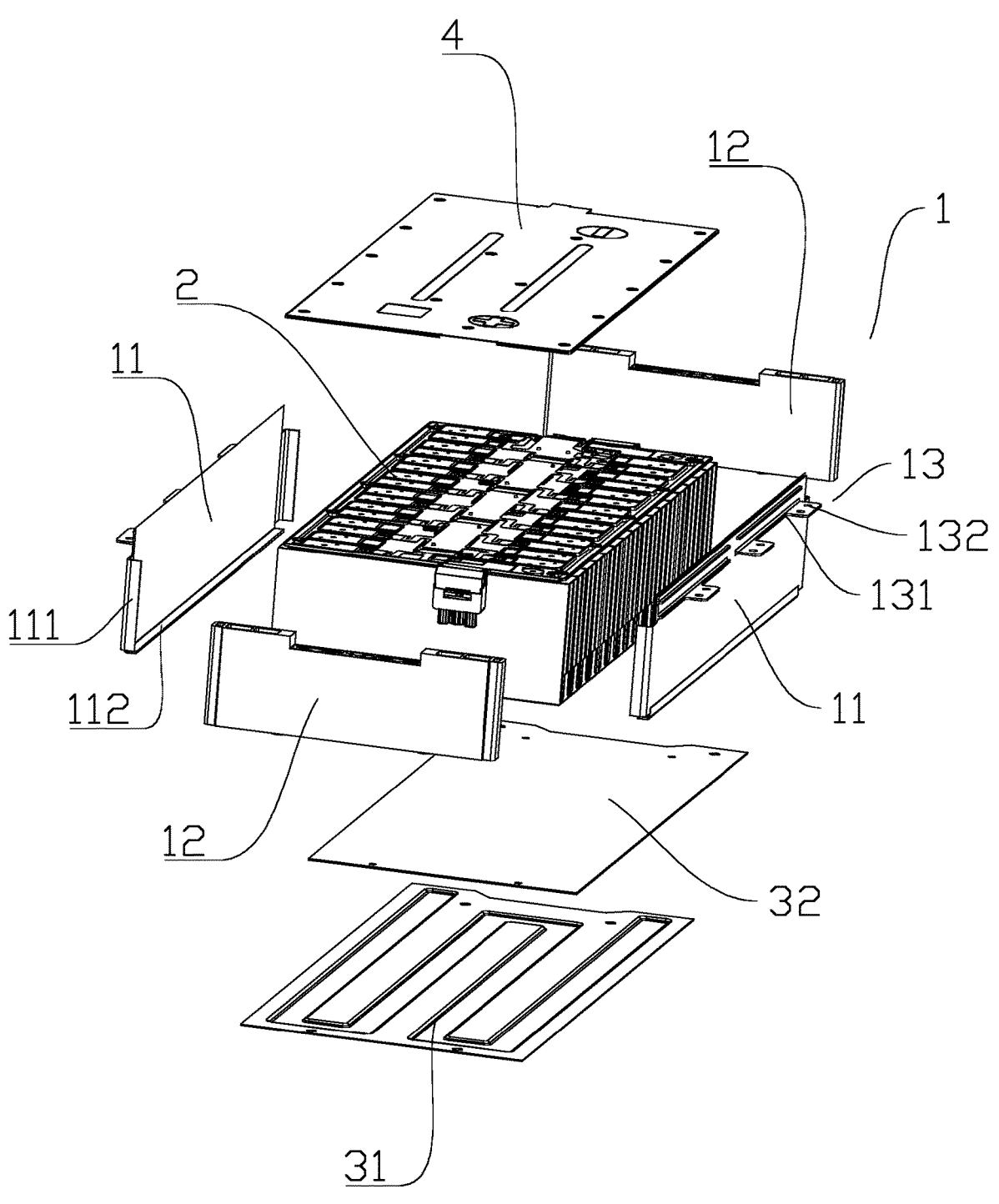
FIG. 2 is an exploded view of a liquid-cooled battery module in an embodiment.

Referring to FIG. 1 and FIG. 2, this embodiment discloses a liquid-cooled battery module, which includes a housing 1, a single battery pack 2, a heat-dissipating component 3, and a cover plate 4. The single battery pack 2 is provided in an accommodating cavity of the housing 1. The cover plate 4 is disposed at the top of the housing 1 and covers the single battery pack 2, and the heat-dissipating component 3 is disposed at the bottom of the housing 1 and is fixedly connected with the single battery pack 2. According to the design of a conventional battery module, the housing 1 of this embodiment has a rectangular parallelepiped structure, and the outer side surfaces of the two opposite side walls of the housing 1 are provided with connecting portions 13. In practical manufacturing process, the shape of the housing 1 may be adjusted according to requirements.

This embodiment further discloses a battery pack, which includes the above-mentioned liquid-cooled battery module. A mounting beam is disposed in the battery pack, and the above-mentioned liquid-cooled battery module is fixed in the battery pack through the connection between the mounting beam and the connecting portion 13.

Since the connecting portion 13 is provided on the outer side surfaces of the two opposite side walls of the housing 1, and the liquid-cooled battery module is heavy, when the liquid-cooled battery module is disposed in the battery pack, the two opposite side walls provided with the connecting portion 13 are easily deformed by force. If the heat-dissipating component 3 is fixedly connected to the two opposite side walls, on the one hand, the heat-dissipating component 3 is easily deformed altogether, resulting in a reduction of the service life of the heat-dissipating component 3; on the other hand, heat transfer will occur between the heat-dissipating component 3 and the two opposite side walls and the mounting beam in the battery pack, which spreads the heat dissipation effect of the heat-dissipating component 3. Consequently, the heat of the single battery pack 2 cannot be dissipated in a concentrated manner, and the risk of thermal runaway of the single battery pack 2 will increase.

Therefore, in the vertical direction, the top surface of the heat-dissipating component 3 in this embodiment is spaced apart from the bottom surfaces of the two opposite side walls provided with the connecting portion, that is, the heat-dissipating component 3 and the two opposite side walls are connected in a non-contact manner. On the one hand, when the liquid-cooled battery module is disposed in the battery pack through the connecting portion 13, the deformation of the side wall with the connecting portion 13 caused by force will not affect the heat-dissipating component 3, thereby ensuring the structural stability and service life of the heat-dissipating component 3; on the other hand, the non-contact connection structure reduces the heat transfer between the heat-dissipating component 3 and the side wall and the mounting beam, thereby ensuring that the heat-dissipating component 3 is able to effectively dissipate the heat from the single battery pack 2.

Specifically, the housing 1 includes two side plates 11 and two end plates 12. Referring to the direction shown in FIG. 2, the two side plates 11 are arranged symmetrically on the left and right, and the two end plates 12 are arranged symmetrically in the front and rear directions. In the horizontal direction, both ends of one side plate 11 in the length direction are connected to one end plate 12, and both ends of one end plate 12 in the length direction are also connected to one side plate 11, thereby forming a housing 1 with a rectangular parallelepiped structure, and the outer side surfaces of the two side plates 11 are provided with connecting portions 13. The heat-dissipating component 3 is disposed at the bottom of the housing 1, and the top surface of the heat-dissipating component 3 is spaced apart from the bottom surfaces of the two side plates 11, and the heat-dissipating component 3 is fixedly connected to the end plate 12.

Figure 4:
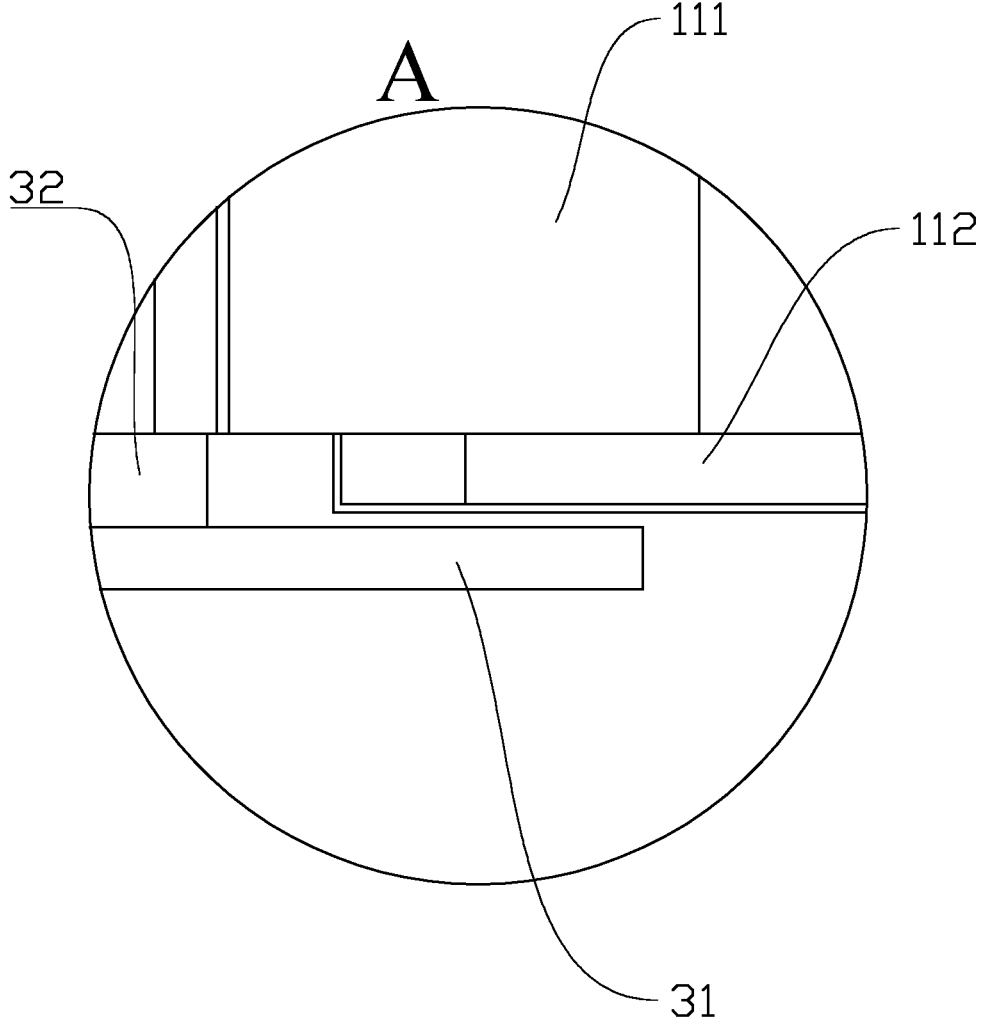
FIG. 4 is an enlarged view of part A in FIG. 3.

Referring to FIG. 2 and FIG. 4, the heat-dissipating component 3 includes a first liquid-cooling plate 31 and a second liquid-cooling plate 32 arranged in a vertical manner. The top surface of the first liquid-cooling plate 31 is spaced apart from the bottom surfaces of the two side plates 11, and is fixedly connected with the two end plates 12. The second liquid-cooling plate 32 is fixed in the middle area at the top surface of the first liquid-cooling plate 31, and the top surface of the second liquid-cooling plate 32 is connected with the bottom surface of the single battery pack 2, thereby connecting the heat-dissipating component 3 to the single battery pack 2 to dissipate heat from the single battery pack 2. The connection between the second liquid-cooling plate 2 and the single battery pack 2 may be optionally implemented through an adhesive, or selected according to actual needs.

Figure 3:
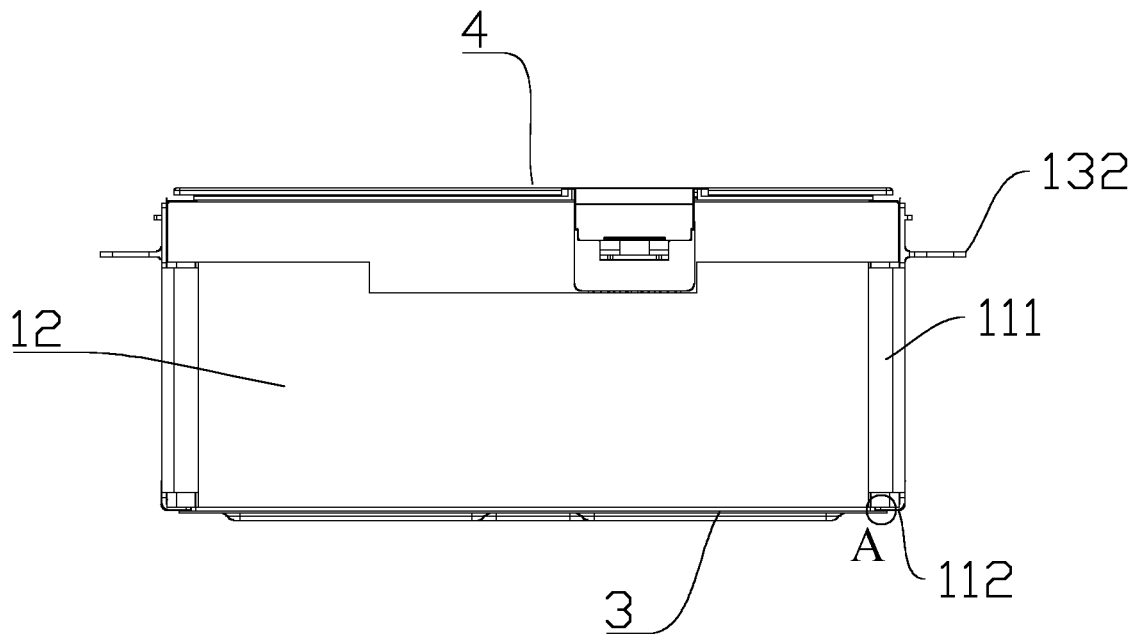
FIG. 3 is a front view of a liquid-cooled battery module in an embodiment.

Preferably, referring to FIG. 1 and FIG. 3, both ends of the two side plates 11 connected to the end plates 12 are provided with an edging 111, and the edging 111 is bent and extend from an end of the side plate 11 toward the outer side surface of the end plate 12. The edging 111 and the end plate 12 are fixedly connected, thereby enhancing the connection stability of the side plate 11 and the end plate 12.

The bottoms of the two side plates 11 are provided with flanges 112. The flanges 112 are bent and extended from the bottom of the side plate 11 toward the bottom surface of the single battery pack 2, so as to support the single battery pack 2 through the flanges 112.

Referring to FIG. 3 and FIG. 4, since the bottom of the side plate 11 is provided with a flange 112, in the configuration of the heat-dissipating component 3, the second liquid-cooling plate 32 is located between the two flanges 112, and there are gaps between the left and right ends of the second liquid-cooling plate 32 and the two flanges 112, so that it is possible to prevent the deformation of the side plate 11 caused by force from affecting the second liquid-cooling plate 32 through the flange 112. In the meantime, in the vertical direction, the first liquid-cooling plate 31 is located at the bottom of the flange 112, and the top surface of the first liquid-cooling plate 31 is spaced apart from the flange 112, thereby preventing the deformation of the side plate 11 caused by force from affecting the first liquid-cooling plate 31 through the flange 112.

It should be noted that, in the horizontal direction, the left and right ends of the first liquid-cooling plate 31 both partially block the flanges 112, that is, the first liquid-cooling plate 31 is extended to the left and right ends in the width direction relative to the second liquid-cooling plate 32 and partially blocks the flange 112. On the one hand, the left and right ends of the first liquid-cooling plate 31 are located below the flange 112, so that it is possible to isolate impurities to a certain extent and prevent impurities from entering the housing 1 through the gap between the flange 112 and the first liquid-cooling plate 31 and affecting the performance of the single battery pack 2; on the other hand, the reason that the first liquid-cooling plate 31 does not completely block the flange 112 is there is an arc transition between the flange 112 and the main body of the side plate 11, and the transition portion protrudes slightly downward, so the first liquid-cooling plate 31 cannot be arranged in a flat manner.

In addition, referring to FIG. 1, the connecting portion 13 of this embodiment includes a rib 131 and a mounting portion 132. The rib 131 extends along the length direction of the side plate 11. In order to facilitate the configuration of the rib 131 with the mounting beam, the rib 131 is normally provided at the middle and upper part of the side plate 11 in a height direction, the mounting portions 132 are arranged on the rib 131 at intervals, and the mounting portion 132 is connected with the mounting beam in the battery pack.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A liquid-cooled battery module, comprising:
   a housing, wherein outer side surfaces of two opposite side walls of the housing are provided with connecting portions, so as to connect the liquid-cooled battery module and a battery pack through the connecting portions;
   a single battery pack, disposed in the housing;
   a heat-dissipating component, which is disposed at a bottom of the housing and is connected to the single battery pack, wherein in a vertical direction, a top surface of the heat-dissipating component and bottom surfaces of the two opposite side walls provided with the connecting portions are spaced apart,
   wherein the housing comprises two side plates and two end plates, the two side plates and the two end plates are disposed opposite to each other, and in a horizontal direction, the two side plates and the two end plates are connected at intervals to form the housing, and outer side surfaces of the two side plates are provided with the connecting portions,
   wherein bottoms of the two side plates are both provided with flanges extending toward the single battery pack, so as to support the single battery pack through the flanges, wherein the heat-dissipating component comprises a first liquid-cooling plate and a second liquid-cooling plate, the second liquid-cooling plate is disposed in a middle area at a top surface of the first liquid-cooling plate, and the second liquid-cooling plate is disposed between the two flanges, the first liquid-cooling plate is disposed at a bottom of each of the flanges, and in the vertical direction, the top surface of the first liquid-cooling plate is spaced apart from each of the flanges,
   wherein the heat-dissipating component and the two opposite side walls are connected in a non-contact manner,
   wherein the first liquid-cooling plate and the second liquid-cooling plate are provided in parallel,
   wherein the second liquid-cooling plate is adhesively connected to the single battery pack, and the first liquid-cooling plate is fixedly connected to the two end plates.

2. The liquid-cooled battery module according to claim 1, wherein the connecting portions comprise a rib and mounting portions, the rib is disposed along a length direction of the two side plates, and the mounting portions are disposed on the rib at intervals.

3. The liquid-cooled battery module according to claim 1, wherein both ends of the two side plates connected to the two end plates are provided with edgings extending toward the two end plates, and the edgings are disposed on outer side surfaces of the two end plates.

4. The liquid-cooled battery module according to claim 3, wherein the side plates and the two end plates are fixedly connected through the edging.

5. The liquid-cooled battery module according to claim 1, wherein the first liquid-cooling plate partially covers the flanges along an extending direction of the flanges.

6. The liquid-cooled battery module according to claim 1, wherein a cover plate is disposed at a top of the housing, and the cover plate covers the single battery pack.

7. A battery pack, comprising the liquid-cooled battery module as claimed in claim 1.

8. The battery pack according to claim 7, wherein a mounting beam is disposed in the battery pack, and the connecting portions are connected with the mounting beam to dispose the liquid-cooled battery module in the battery pack.

\* \* \* \* \*